(12) United States Patent
Hater et al.

(10) Patent No.: US 6,742,962 B2
(45) Date of Patent: Jun. 1, 2004

(54) INFILTRATION AND GAS RECOVERY SYSTEMS FOR LANDFILL BIOREACTORS

(75) Inventors: Gary Hater, Cincinnati, OH (US); John A. Barbush, Goshen, KY (US); Richard N. Barr, Sellersburg, IN (US)

(73) Assignee: Waste Management, Inc., Houston, TX (US)

(*) Notice: Subject to any disclaimer, the term of this patent is extended or adjusted under 35 U.S.C. 154(b) by 0 days.

(21) Appl. No.: 10/260,179

(22) Filed: Sep. 30, 2002

(65) Prior Publication Data

US 2004/0062610 A1 Apr. 1, 2004

(51) Int. Cl.[7] .............................. B09B 5/00; B09C 1/00
(52) U.S. Cl. .............................. 405/129.95; 405/129.6; 405/128.15; 405/128.2; 405/128.25; 405/128.3
(58) Field of Search .................... 405/128.15, 128.2, 405/128.25, 128.3, 128.45, 128.5, 129.25, 129.95, 129.6

(56) References Cited

U.S. PATENT DOCUMENTS

| 4,323,367 A | * | 4/1982 | Ghosh ..................... 48/197 A |
| 4,396,402 A | * | 8/1983 | Ghosh ..................... 48/197 A |
| 4,442,901 A | * | 4/1984 | Zison ...................... 166/369 |
| 4,670,148 A | * | 6/1987 | Schneider ................. 210/603 |
| 5,161,914 A | * | 11/1992 | Rahn et al. .............. 405/128.2 |
| 5,372,459 A | * | 12/1994 | Prange et al. ......... 405/129.95 |
| 5,484,279 A | | 1/1996 | Vonasek |
| 5,564,862 A | * | 10/1996 | Markels, Jr. ............. 405/129.2 |
| 5,857,807 A | * | 1/1999 | Longo, Sr. ............... 405/129.7 |
| 6,024,513 A | * | 2/2000 | Hudgins et al. ....... 405/129.95 |
| 6,169,962 B1 | | 1/2001 | Brookshire et al. |
| 6,283,676 B1 | | 9/2001 | Hater et al. |
| 6,334,737 B1 | | 1/2002 | Lee |
| 2001/0005812 A1 | | 6/2001 | Brookshire et al. |

FOREIGN PATENT DOCUMENTS

| EP | 0 363 508 | 3/1992 |
| EP | 0 505 218 | 9/1992 |

* cited by examiner

Primary Examiner—Heather Shackelford
Assistant Examiner—Lisa M. Saldano
(74) Attorney, Agent, or Firm—McDonnell Boehnen Hulbert & Berghoff

(57) ABSTRACT

A trench located in a landfill including the combination of a liquid infiltration piping system and a horizontal gas withdrawal piping system, the combination allowing for simultaneous liquid infiltration and gas withdrawal from a landfill.

32 Claims, 3 Drawing Sheets

INFILTRATION AND GAS RECOVERY SYSTEMS FOR LANDFILL BIOREACTORS

BACKGROUND OF THE INVENTION (1) Field of the Invention

This invention concerns a trench located in a landfill including the combination of a liquid infiltration piping system and a horizontal gas withdrawal piping system that allows for simultaneous liquid infiltration and gas withdrawal. The trench of this invention can be retrofit into existing landfills or they can be incorporated into landfills as the landfill is being constructed.

(2) Description of the Art

The recovery of landfill gases including light hydrocarbons such as methane has become commonplace and is regulated under New Source Pollution Standards (NSPS). It used to be common to burn gasses vented from landfill. However, it is becoming more common to use landfill gases to generate heat and or electricity.

Landfill leachate—the aqueous solution that accumulates at the bottom of landfills also poses disposal and odor problems. One method for dealing with leachate odor problems that is gaining wide acceptance is to pump the leachate from the bottom to the top of the landfill to allow the leachate to percolate though the landfill where biological material in the leachate provide nutrition source for microorganisms that remediate the leachate. The recirculation of landfill leachate has led to the conversion of areas of landfills—known as cells—into anaerobic or aerobic bioreactors. The normal biological degradation of organic landfill materials can be dramatically accelerated in bioreactors resulting in the creation of more landfill airspace thereby extending the useful landfill life.

The prior art discloses several methods for withdrawing gas from landfills. EU Publication Number 036508B1 discloses a method of controlling the recovery of landfill gas from a sanitary landfill by measuring the temperature of the gas and adapting the gas withdraw according to the temperature measurements. A similar landfill monitoring and control system is disclosed in U.S. case 2001/0005812 A1.

European Patent Application No. 0505218 A1 discloses concrete components including elongated hollow cylindrical piles that are installed in landfills in order to remove landfill gases. The disclosed piles are designed to be vertically orientated in a landfill.

U.S. Pat. No. 6,334,737 discloses a method of controlling landfill gas generation within a landfill in which leachate is recycled and continuously injected into the landfill while extracting the landfill gas from a landfill gas extraction pipe inserted into the waste.

U.S. Pat. No. 6,283,676 discloses a landfill including multiple lifts having horizontal piping layers and the methods for their use to accelerate anaerobic and or aerobic degradation of municipal solid waste in order to increase landfill capacity.

The combination of leachate recirculation and gas extraction of landfill has created a problem with gas extraction well flooding and fouling. To avoid flooding, the leachate is typically supplied in horizontal pipes while gas is extracted from the landfill in the region of lechate infiltration in vertical piping. This requirement for both vertical and horizontal piping in the landfill makes installation difficult and expensive. There is a need therefore for landfill gas extraction that are easier cheaper to construct and that use horizontal gas extraction piping systems.

SUMMARY OF THE INVENTION

One aspect of this invention is a landfill trench comprising; a bottom material; at least one horizontal gas collection pipe; at least one liquid distribution pipe; a cover material; and a filler material located between the bottom and the cover material.

Another aspect of this invention is a landfill having a plurality of trenches, each trench comprising a bottom material; at least one horizontal gas collection pipe; at least one horizontal liquid distribution pipe; a cover material; and a filler material located between the bottom and the cover material wherein the landfill further includes a gas piping header and a gas riser that unites the horizontal gas collection pipes of each of at least two trenches with the gas header, and a liquid header wherein a liquid riser unites the liquid header with each horizontal liquid distribution pipe.

DESCRIPTION OF THE CURRENT EMBODIMENT

The present invention includes a landfill including a moisture infiltration piping system in combination with horizontal gas extraction piping system as well as to methods for installing the piping systems in a landfill.

As used herein the term "liquid" refers to any source of water including landfill leachate, fresh water, waste water of any kind, and any combinations thereof.

The term "horizontal" when used in conjunction with a description of a liquid distribution pipe a or a gas collection pipe refers to piping that may be placed on a grade from 0 to 10° from horizontal. The term horizontal does not require that the piping be precisely horizontal. Deviation from a horizontal orientation is also anticipated based upon variations it the landfill slope trench construction.

Liquid will typically be applied to the landfill on a continuous or an intermittent basis in order to maintain the landfill moisture content in a range of about 35 wt % and preferably to at least 55 wt %. In arid regions of the country, waste moisture can typically only be increased to 10–20% by weight because the starting waste moisture content is very low. The moisture content of the waste can lie outside of this range depending upon the moisture holding capacity of the waste and the purpose for adding liquid to the landfill. There are several reasons for adding liquids to active landfills. Liquids can be added to landfill bioreactors in order to facilitate landfill aerobic or anaerobic bioremediation. In addition, liquids such as leachate may be added to landfills in order to remove unwanted inorganic materials from the leachate. As the leachate percolates through the landfill, anaerobic or aerobic microorganisms and bacteria consume organic materials in the leachate thereby remeditating the recirculated leachate.

Figure 1:
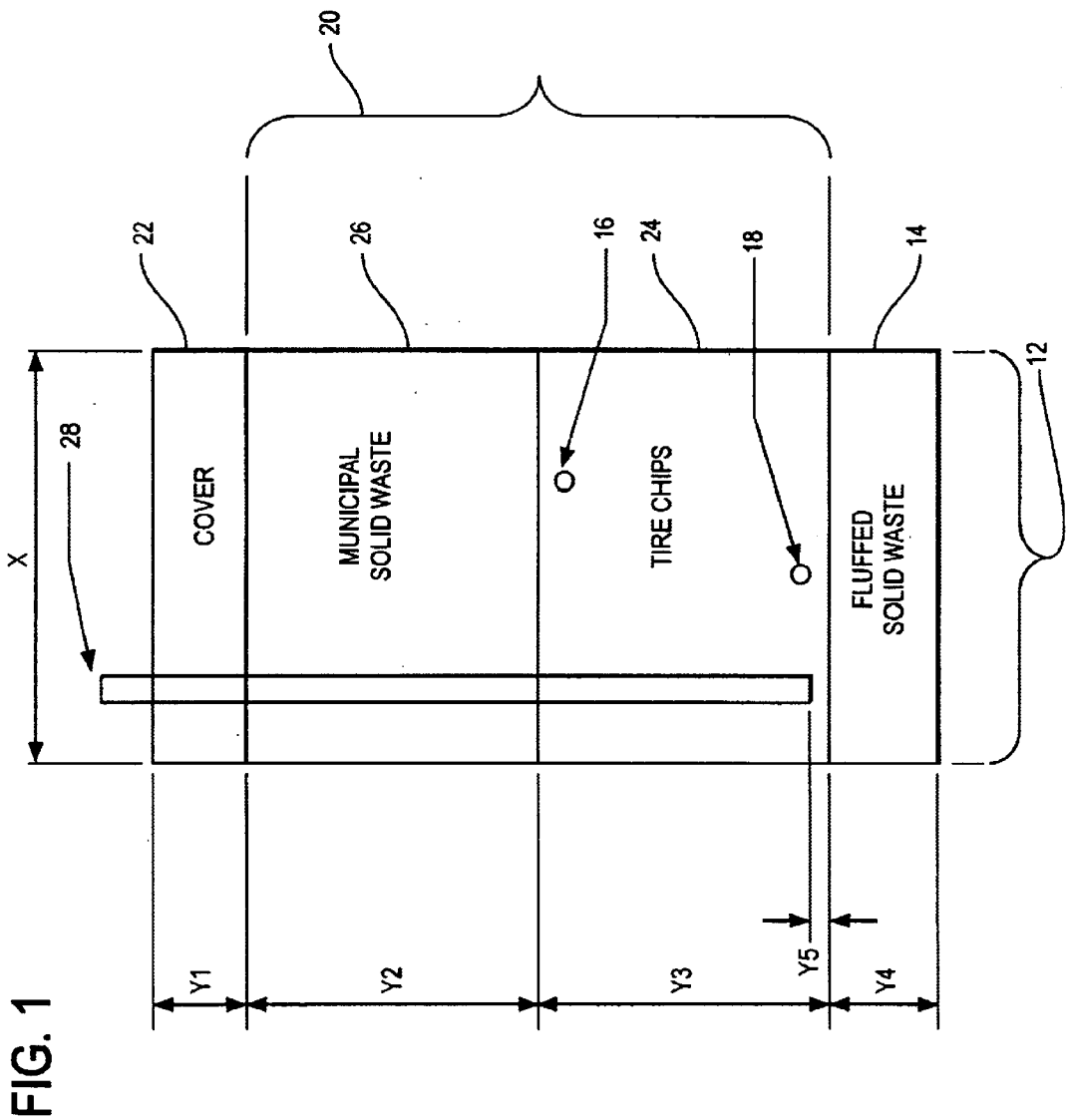
FIG. 1 is a side cross section view of a landfill trench of this invention including horizontal liquid distribution piping and horizontal landfill gas collection piping.

The present invention will be described in reference to FIGS. 1–3 which disclose an embodiment of the trenches and landfills of this invention. FIG. 1 is a cross-section view of a trench 12 of this invention which is located in a landfill 10. Trench 12 may be retrofit into an existing landfill or it may be constructed as compostable material is added to a landfill. Trench 10 includes a bottom material 14, a filler material layer 20 and a cover material layer 22. A horizontal collection pipe 16 is located in filler material layer 20 as is a liquid distribution pipe 18. Liquid distribution pipe 18 may be a horizontal or a vertical liquid distribution pipe. In a preferred embodiment, liquid distribution pipe 18 will be a horizontally orientated liquid distribution pipe. According to FIG. 1, horizontal gas collection pipe is located at a distance from cover layer material 22 that is less than the distance of liquid distribution pipe 18 from cover material layer 22. If liquid distribution pipe 18 is a vertical distribution pipe, then it is preferred that the majority of perforations are at a point lower in the filler material than horizontal gas collection pipe 16. In a most preferred embodiment, when the distribution pipe is a horizontal pipe, all liquid distribution perforations will be located at a point lower in the landfill than the location of horizontal gas collection pipe 16. By locating the perforated portions of liquid distribution pipe 18 below horizontal gas collection pipe 16, the chance of landfill infiltrating liquids entering the gas collection system are minimized.

Trench 12 may further include a monitoring well 28. Typically monitoring well 28 will be that is solid or that includes an open bottom or perforations near the point where monitoring is to be accomplished. Monitoring well 28 may be thermocouple monitoring well, a piezometer well, or may include any other type of monitoring device that are known in the prior art for monitoring and controlling landfill gas collection.

The thicknesses of the various material levels in trench 12 can vary significantly. Cover material layer 22 will generally have a thickness Y1 of from 6 inches to 5 feet or more and has a preferred thickness of from about 1 to about 4 feet. The depth Y2+Y3 of filler material layer 20 will range from about 10 feet to about 40 feet or more. Preferably, filler material layer will have a depth of from about 5 to about 20 feet. Filler material layer 20 is preferably divided into a course material layer 24 and a municipal solid waste layer 26. Course material layer 24 preferably has a depth Y3 sufficient to cover both horizontal gas collection pipe 16 and liquid distribution pipe 18. The course material used in course material layer 24 may be any type of material that will facilitate the distribution or removal of gases and/or liquids from the landfill. Such materials may include, for example, tire chips or shreds, gravel, sand, concrete waste, stone waste, glass cullet, and combinations thereof. It is preferred that the course material is tire chips or gravel. If a course material layer 24 is used, the course material layer 24 will have a depth Y3 of from 3 to 15 feet and a more preferred depth of from about 3 to 10 feet. Municipal solid waste layer Y2 will have a depth of from 5 to 25 feet and a preferred depth of from 7 to 12 feet.

Bottom material 14 is preferably a municipal solid waste layer and most preferably a fluffed solid waste layer. Fluffing of the bottom material 14 is accomplished by having the excavator fluff or rake the in place waste with the end of the bucket. Bottom material layer depth Y4 will generally range of from about 1 to 10 feet and preferably a depth from about 2 to 5 feet.

If a monitoring well 28 is located in trench 12, then the monitoring well depth will be at a height Y5 above bottom material layer 14 of from 2 inches to 2 feet and preferably at a height of about 6 inches above bottom material layer 14.

The width X of trench 12 can vary significantly from about 1 to about 10 feet or more. A preferred width is from about 2 to about 5 feet. Trench 12 is constructed using standard mechanical trenching tools or manually. Trench 12 is prepared having the desired total depth of Y1+Y2+Y3+Y4. Next, the bottom material layer is preferably fluffed if it is a solid waste layer. Next, the horizontal gas collection pipe 16 and liquid distribution pipes 18 are located in trench 12 and the trench is filled with filler material which preferably is a course material layer 24 covered by a municipal solid waste layer 26. Finally, a cover layer 22 of dirt, clay, plastic or some other material is added until trench 12 is completely filled.

Figure 2:
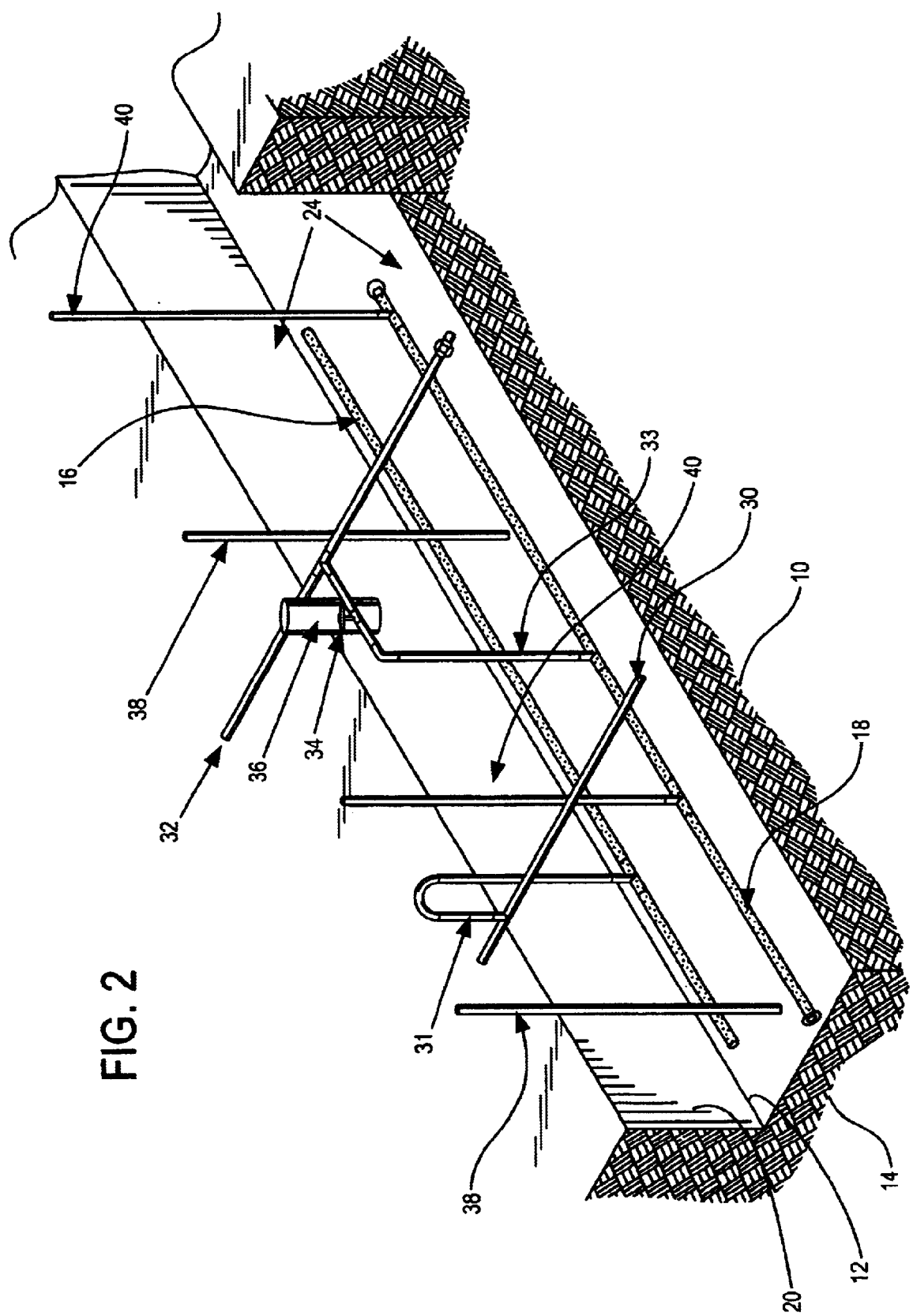
FIG. 2 is a perspective view of a landfill trench of this invention including horizontal liquid distribution piping and horizontal landfill gas collection piping.

FIG. 2 is a perspective view of a trench 12 of this invention including additional header and riser pipes that are used in landfills that include a plurality of trenches of this invention. The trench shown in FIG. 2 includes a perforated horizontal gas collection pipe 16 and a perforated liquid distribution pipe 18 that is also horizontally orientated. Liquid distribution pipe 18 is located in trench 12 at a depth from cover material layer 22 that is greater than the depth of horizontal gas collection pipe 16 from cover material layer 22. Trench 12 of FIG. 2 further includes a thermocouple monitoring wells 38 and a piezeometer wells 40 which is associated with liquid distribution pipe 18. The purpose of piezeometer well 40 is to allow for monitoring of the liquid distribution and determine if infiltration gallery is not draining properly.

Horizontal gas collection pipe 16 is connected to gas riser 31 which is further connected to gas piping header 30. A vacuum pump or some other vacuum device is associated with gas piping header 30 thereby drawing landfill gas through the perforations in horizontal gas collection pipe 16 through gas riser 31 and into gas piping header 30. The gas withdrawn from the landfill can be vented and burned or it can be used for heating or other industrial purposes before or after removing unwanted liquids and other contaminants from the gas.

Liquid distribution pipe 18 is connected to liquid riser pipe 33 which in turn is connected to liquid distribution manifold 32. Liquid riser 33 may include a valve 34 for controlling the amount of liquid that is injected into the landfill or to turn the liquid injection on or off. Valve 34 will typically be located in a valve vault 36 to provide access to and/or control of valve 34.

The control of liquid injection and/or gas withdraw from landfill trench 12 may be automatic or manual. Control valves may be associated with both gas riser 31 and/or liquid riser 33. In addition, a vacuum pump associated with gas piping header 30. A control valve can be included on the compressor outline line to control the amount of gas being withdrawn from the landfill in order to control temperature, gas composition, pressure drop and so forth.

Figure 3:
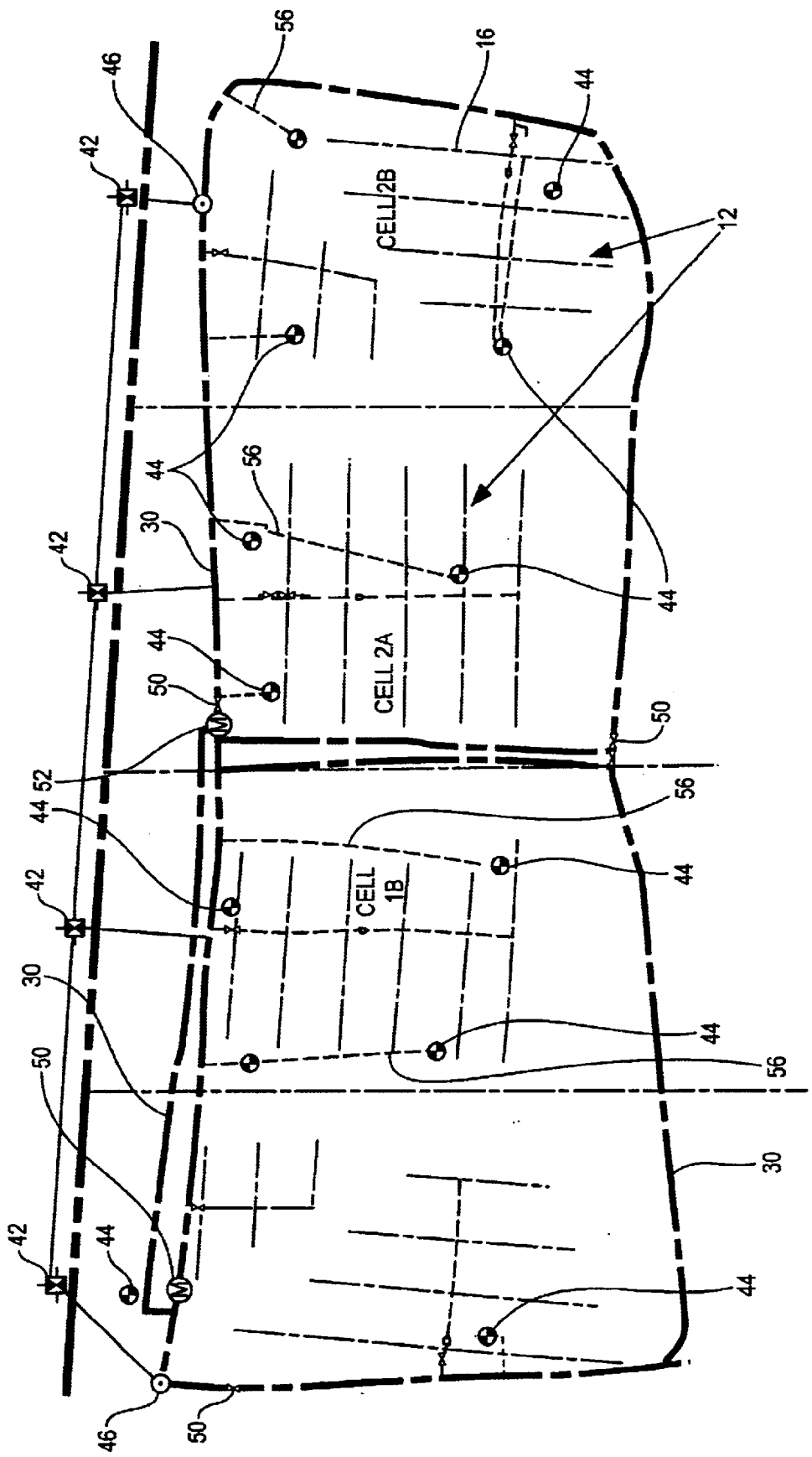
FIG. 3 is an overhead view of the layout of horizontal liquid distribution piping and horizontal landfill gas collection piping in a multiple-cell landfill.

FIG. 3 is an overhead view of a landfill including multiple trenches 12 defining multiple landfill cells 60. The landfill in FIG. 3 includes a plurality of trenches including horizontal gas collection pipes and liquid distribution pipes. The landfill further includes a gas piping header 30, a plurality of leachate collection risers 42, a plurality of gas collection wells 44, and a plurality of condensation drip legs 46 for removing gas condensate and directing it back into the landfill. Removing of this liquid prevents flooding out of the piping. The landfill further includes control valves 50 for controlling the volume of gas being withdrawn through gas header 30, metering station 52 and gas lateral pipe 56. Gas lateral pipe 56 is part of gas piping header 30. The landfill depicted in FIG. 3 also includes a plurality of trenches 12 that are associated with a plurality of pipes defining a gas piping header 30.

The landfills of this invention must include at least some compostable waste materials. Preferably, the waste material used to construct the landfill will include at least 40% and preferably 75% or more of compostable material. Preferably, the waste material is municipal solid waste. Additionally, industrial wastes, sludges, and biosolids are typically commingled with the municipal solid waste.

The piping used to construct piping systems including the various piping layers associated with each lift may be any type of piping that is useful in landfill bioremediation. Preferably, the piping is a plastic piping such as high density polyethylene (HDPE) or polyvinylchloride (PVC). The piping used for the horizontal gas collection piping and liquid distribution piping must include perforations or an open end to allow for the injection of liquids into and/or the withdrawal of gases from the landfill. Preferably, the perforated piping includes uniformly distributed perforations that allow for the uniform addition or removal of gases from and/or liquids to the landfill. In addition, the piping may be packed with packing materials such plastic mesh or ground up tires to facilitate distribution and/or removal of gases and liquids from the landfill bioreactor.

Trenches 12 of this invention may be installed or retrofit in a standard landfill or they may be installed or retrofit into landfill bioreactors including aerobic landfill bioreactors and anaerobic landfill bioreactors.

The operation of the gas withdrawal system of this invention may cause a reduction of volume of the landfill lifts. This reduction in volume can be improved by compacting the landfill lifts. Thus, for example a landfill bioreactor can be mechanically compacted or loaded once gas withdrawal is underway.

The addition of materials to accelerate the aerobic and/or anaerobic decomposition of compostable waste material is within the scope of this invention. Additive materials may be incorporated to the waste as it is being located in lifts or it may be added to the waste through the gas or liquids added to the lifts through the piping systems. For example, sludge, animal manure, fermentor byproducts and so forth may be added to the waste material or to liquids added to the waste material by the piping systems in order to provide microorganisms that accelerate or enhance aerobic and/or anaerobic biodegradation of compostable waste. In addition, nutrients such as phosphorous, phosphoric acid, biosolids, buffered phosphate and the like may be added directly to the waste or may be added to liquids applied to the waste to accelerate anaerobic or aerobic degradation of a municipal solid waste. Nitrated ($NO_3^-$) leachate from waste water treatment reactors may be added as a means to accelerate nitrate degradation and to eliminate ammonia build up as described in U.S. Pat. No. 6,398,958 B1. The specification of which is incorporated herein by reference.

The trenches of this invention may be located in new landfills. The trenches will be formed as waste material is placed in the landfill. Typically, a lift of municipal solid waste will be located in the landfill and trenches, spaced apart as described above will be constructed in the lift. A cover material will be placed over the lift and a second lift of municipal solid waste will be located in the landfill. Trenches may be located in the second and subsequent lifts. Generally if trenches are located in multiple lifts, then the trenches will be vertically offset from one another to provide for uniform liquid distribution and gas withdraw from the multiple landfill lifts. In one installation pattern, a trench will be located in a first vertical position in a first lift. In the second lift, there will be no trench in the same vertical position as the first trench in the first lift. However, trenches will be located at a horizontal distance of from 10 to 50 feet from the first trench in the first lift. In a third lift, a trench will be located in essentially the same vertical position as the first trench in the first lift.

What is claimed is:

1. A landfill trench comprising:
   a bottom material;
   at least one horizontal gas collection pipe;
   at least one liquid distribution pipe;
   a cover material; and
   a filler material located between the bottom and the cover material
   wherein the bottom, cover and filler materials are three different materials, and the at least one horizontal gas collection pipe and the at least one liquid distribution pipe are located in the same landfill trenches.

2. The landfill trench of claim 1 wherein the liquid distribution pipe is a horizontal liquid distribution pipe.

3. The landfill trench of claim 2 wherein the vertical distance from the horizontal gas collection pipe to the cover material is less than the vertical distance from the horizontal liquid distribution pipe to the cover material.

4. The landfill trench of claim 2 wherein the horizontal liquid distribution pipe has a slope of from 1% to 10%.

5. The landfill trench of claim 2 wherein the filler material includes a coarse material layer.

6. The landfill trench of claim 5 wherein the coarse material layer is a layer of at least one porous inorganic material.

7. The landfill trench of claim 6 wherein the coarse inorganic material is tire chips.

8. The landfill trench of claim 5 wherein the horizontal gas collection pipe and the horizontal liquid distribution pipe are covered by the coarse material layer.

9. The landfill trench of claim 1 wherein the bottom material is municipal solid waste.

10. The landfill trench of claim 1 wherein the bottom material is fluffed municipal solid waste.

11. The landfill trench of claim 1 wherein the filler material includes a coarse material layer covering the trench bottom and a municipal solid waste layer covering the coarse material layer wherein the horizontal gas collection pipe and the horizontal liquid distribution pipe are both located in the coarse material layer.

12. The landfill trench of claim 1 including at least one monitoring well.

13. The landfill trench of claim 12 wherein the monitoring well is selected from a temperature monitoring well, a gas monitoring well, a piezeometer well, and combinations thereof.

14. A landfill bioreactor including the trench of claim 1.

15. The landfill bioreactor of claim 14 wherein the bioreactor is selected from an anaerobic bioreactor and an aerobic bioreactor.

16. The trench of claim 1 including one or more vertical liquid distribution pipes.

17. The landfill trench of claim 1 wherein the filler material is municipal solid waste.

18. A landfill having a plurality of trenches, each trench comprising a bottom material;
   at least one horizontal gas collection pipe;
   at least one horizontal liquid distribution pipe;

a cover material; and a filler material located between the bottom and the cover material wherein the landfill further includes a gas piping header and a gas riser that unites the horizontal gas collection pipes of each of at least two trenches with the gas header, and a liquid header wherein a liquid riser unites the liquid header with each horizontal liquid distribution pipe wherein the bottom, cover and filler materials are three different materials, and the at least one horizontal gas collection pipe and the at least one horizontal liquid distribution pipe are located in the same landfill trench.

19. The landfill of claim 18 wherein the liquid distribution pipe is a horizontal liquid distribution pipe.

20. The landfill of claim 19 wherein the vertical distance from the horizontal gas collection pipe to the cover material is less than the vertical distance from the horizontal liquid distribution pipe to the cover material.

21. The landfill of claim 19 wherein the horizontal gas collection pipe and the horizontal liquid distribution pipe are covered by the coarse material layer.

22. The landfill of claim 18 wherein the trench filler material is municipal solid waste.

23. The landfill of claim 18 wherein the trench filler material includes a coarse material layer.

24. The landfill of claim 23 wherein the coarse material layer is a layer of at least one coarse inorganic material.

25. The landfill of claim 24 wherein the coarse inorganic material is tire chips.

26. The landfill of claim 18 wherein the trench bottom material is municipal solid waste.

27. The landfill of claim 18 wherein the trench filler material includes a coarse material layer covering the trench bottom and a municipal solid waste layer covering the coarse material layer wherein the horizontal gas collection pipe and the horizontal liquid distribution pipe are both located in the coarse material layer.

28. The landfill of claim 18 including at least one monitoring well.

29. The landfill of claim 28 wherein the monitoring well is selected from a temperature monitoring well, a gas monitoring well, a piezeometer well, and combinations thereof.

30. The landfill of claim 18 including one or more vertical liquid distribution pipes.

31. The landfill of claim 17 wherein at least one vertical distribution pipe is located in a trench.

32. The landfill of claim 18 wherein the trench bottom material is fluffed municipal solid waste.

* * * * *